US011921608B2

(12) United States Patent
Van Den Heuvel et al.

(10) Patent No.: US 11,921,608 B2
(45) Date of Patent: Mar. 5, 2024

(54) IDENTIFYING A PROCESS AND GENERATING A PROCESS DIAGRAM

(71) Applicant: Accenture Global Solutions Limited, Dublin (IE)

(72) Inventors: Jeroen Van Den Heuvel, Rotterdam (NL); Myrto Maria Karachontziti, Utrecht (NL); Pradyumna Moderahalli Krishna Prasad, Alkmaar (NL); Jeroen Rook, Utrecht (NL); Jan Welscheid, Antibes (FR); Mohamed Amine Bourkhiss, Paris (FR); Marek Bezaniuk, Bratislava (SK); Matus Kovac, Bratislava (SK); Nguyen Nhat Huy, Bratislava (SK); Richard Leo Joseph Hendrick Claus, Amsterdam (NL); Hanneke Daniëlle Henders Ten Hove, Utrecht (NL); Cyrille Bataller, Mougins (FR); Vitalie Schiopu, Bertrange (LU); Kalyanam Vamshi Krishna, Hyderabad (IN)

(73) Assignee: Accenture Global Solutions Limited, Dublin (IE)

( * ) Notice: Subject to any disclaimer, the term of this patent is extended or adjusted under 35 U.S.C. 154(b) by 29 days.

(21) Appl. No.: 17/452,832

(22) Filed: Oct. 29, 2021

(65) Prior Publication Data
US 2022/0138076 A1 May 5, 2022

(30) Foreign Application Priority Data

Oct. 30, 2020 (GR) .............................. 20200100659

(51) Int. Cl.
*G06F 11/34* (2006.01)
*G06F 18/10* (2023.01)
(Continued)

(52) U.S. Cl.
CPC .......... *G06F 11/3438* (2013.01); *G06F 18/10* (2023.01); *G06F 18/2133* (2023.01); *G06F 18/22* (2023.01)

(58) Field of Classification Search
CPC ... G06V 20/176; G06F 11/0793; G06F 9/451; H04L 67/535; H04L 65/403; G16B 30/00; G16B 30/10; H04N 21/44226
See application file for complete search history.

(56) References Cited

U.S. PATENT DOCUMENTS 8,665,132 B2 * 3/2014 Ranney ............... G01S 13/9089
342/25 R
9,555,544 B2 1/2017 Bataller et al.
(Continued)

*Primary Examiner* — Mahran Y Abu Roumi
(74) *Attorney, Agent, or Firm* — Harrity & Harrity, LLP

(57) ABSTRACT

A device may receive activity data identifying activities of a process performed by users via user devices. The device may receive baseline data identifying baselines associated with the process and variant data identifying variants from the baselines. The device may apply a sequence alignment model, to the activity data and the baseline data, to determine first similar sequences associated with the activities and the baselines and may apply the sequence alignment model, to the activity data and the variant data, to determine second similar sequences associated with the activities and the variants. The device may determine, based on the first similar sequences, first label data identifying first labels for the activities and may determine, based on the second similar sequences, second label data identifying second labels for the activities. The device may generate a process diagram based on the activity data, the first label data, and the second label data.

20 Claims, 12 Drawing Sheets

(51) Int. Cl.
*G06F 18/2133* (2023.01)
*G06F 18/22* (2023.01)

(56) References Cited

U.S. PATENT DOCUMENTS

| | | |
|---|---|---|
| 9,805,306 B1 | 10/2017 | Bataller et al. |
| 10,235,192 B2 | 3/2019 | Hall et al. |
| 10,528,812 B1 | 1/2020 | Brouard et al. |
| 10,878,531 B2 | 12/2020 | Viet et al. |
| 10,970,543 B2 | 4/2021 | Brouard et al. |
| 2011/0012778 A1* | 1/2011 | Nguyen ............... G01S 13/9089 342/25 A |
| 2012/0239706 A1* | 9/2012 | Steinfadt ................ G16B 30/00 707/E17.044 |
| 2014/0129942 A1* | 5/2014 | Rathod ............ H04N 21/44226 715/720 |
| 2014/0172824 A1* | 6/2014 | Musuvathi ............. G16B 30/10 707/719 |
| 2017/0001308 A1* | 1/2017 | Bataller ................. B25J 9/1679 |
| 2017/0206409 A1 | 7/2017 | Bataller |
| 2020/0372882 A1* | 11/2020 | Pachet ................. G10H 1/0008 |
| 2022/0019441 A1* | 1/2022 | Rosing ................... G16B 30/10 |
| 2022/0034913 A1* | 2/2022 | Wang ...................... A61P 25/28 |

* cited by examiner

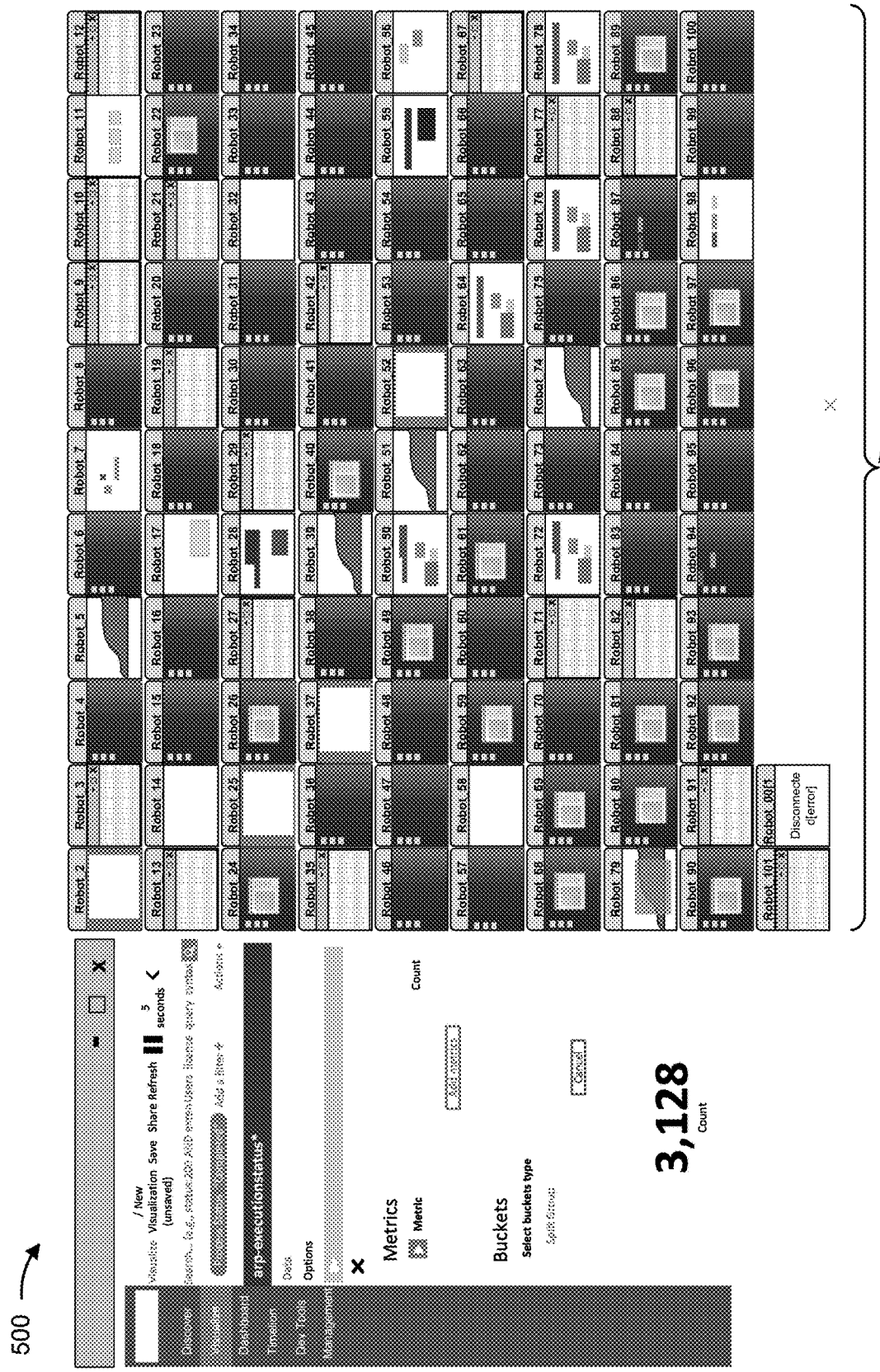
FIG. 5A  Screenshots of individual activities of a process

IDENTIFYING A PROCESS AND GENERATING A PROCESS DIAGRAM

CROSS-REFERENCE TO RELATED APPLICATION

This patent application claims priority to Greece Patent Application No. 20200100659, filed on Oct. 30, 2020, entitled "IDENTIFYING A PROCESS AND GENERATING A PROCESS DIAGRAM," and assigned to the assignee hereof. The disclosure of the prior application is considered part of and is incorporated by reference in this patent application.

BACKGROUND

A process diagram shows a series of activities of a process that produces an end result. A process diagram is also called a flowchart, a process flowchart, a process chart, a functional process chart, a functional flowchart, a process model, a workflow diagram, a business flow diagram, or a process flow diagram.

SUMMARY

In some implementations, a method includes receiving, by a device, activity data identifying activities of a process performed by users via user devices; receiving, by the device, baseline data identifying baselines associated with the process and first similarity labels associated with the baselines; receiving, by the device, variant data identifying variants from the baselines and second similarity labels associated with the variants; applying, by the device, a sequence alignment model, to the activity data and the baseline data, to determine first similar sequences associated with the activities and the baselines; applying, by the device, the sequence alignment model, to the activity data and the variant data, to determine second similar sequences associated with the activities and the variants; determining, by the device, based on the first similarity labels in the baseline data, and based on the first similar sequences, first label data identifying first labels for the activities; determining, by the device, based on the second similarity labels in the variant data, and based on the second similar sequences, second label data identifying second labels for the activities; generating, by the device, a process diagram based on the activity data, the first label data, and the second label data; and performing, by the device, one or more actions based on the process diagram.

In some implementations, a device includes one or more memories; and one or more processors, communicatively coupled to the one or more memories, configured to: receive activity data identifying activities of a process performed by users via user devices; receive baseline data identifying baselines associated with the process and first similarity labels associated with the baselines; receive variant data identifying variants from the baselines and second similarity labels associated with the variants; apply a sequence alignment model, to the activity data and the baseline data, to determine first similar sequences associated with the activities and the baselines; apply the sequence alignment model, to the activity data and the variant data, to determine second similar sequences associated with the activities and the variants; determine, based on the first similarity labels in the baseline data, and based on the first similar sequences, first label data identifying first labels for the activities; determine, based on the second similarity labels in the variant data, and based on the second similar sequences, second label data identifying second labels for the activities; identify, based on the first label data and the second label data, missing label data in the activity data; receive third label data identifying third labels for the activities, wherein the third label data corresponds to the missing label data; generate a process diagram based on the activity data, the first label data, the second label data, and the third label data; and perform one or more actions based on the process diagram.

In some implementations, a non-transitory computer-readable medium storing a set of instructions includes one or more instructions that, when executed by one or more processors of a device, cause the device to: receive activity data identifying activities of a process performed by users via user devices; receive baseline data identifying baselines associated with the process and first similarity labels associated with the baselines; receive variant data identifying variants from the baselines and second similarity labels associated with the variants; apply a sequence alignment model, to the activity data and the baseline data, to determine first similar sequences associated with the activities and the baselines; apply the sequence alignment model, to the activity data and the variant data, to determine second similar sequences associated with the activities and the variants; determine, based on the first similarity labels in the baseline data, and based on the first similar sequences, first label data identifying first labels for the activities; determine, based on the second similarity labels in the variant data, and based on the second similar sequences, second label data identifying second labels for the activities; generate a process diagram based on the activity data, the first label data, and the second label data; and provide the process diagram for display to one or more of the user devices.

BRIEF DESCRIPTION OF THE DRAWINGS

FIGS. 5A-5C illustrate examples of a user interface associated with a process discovery system described herein.

DETAILED DESCRIPTION

Figure 1A:
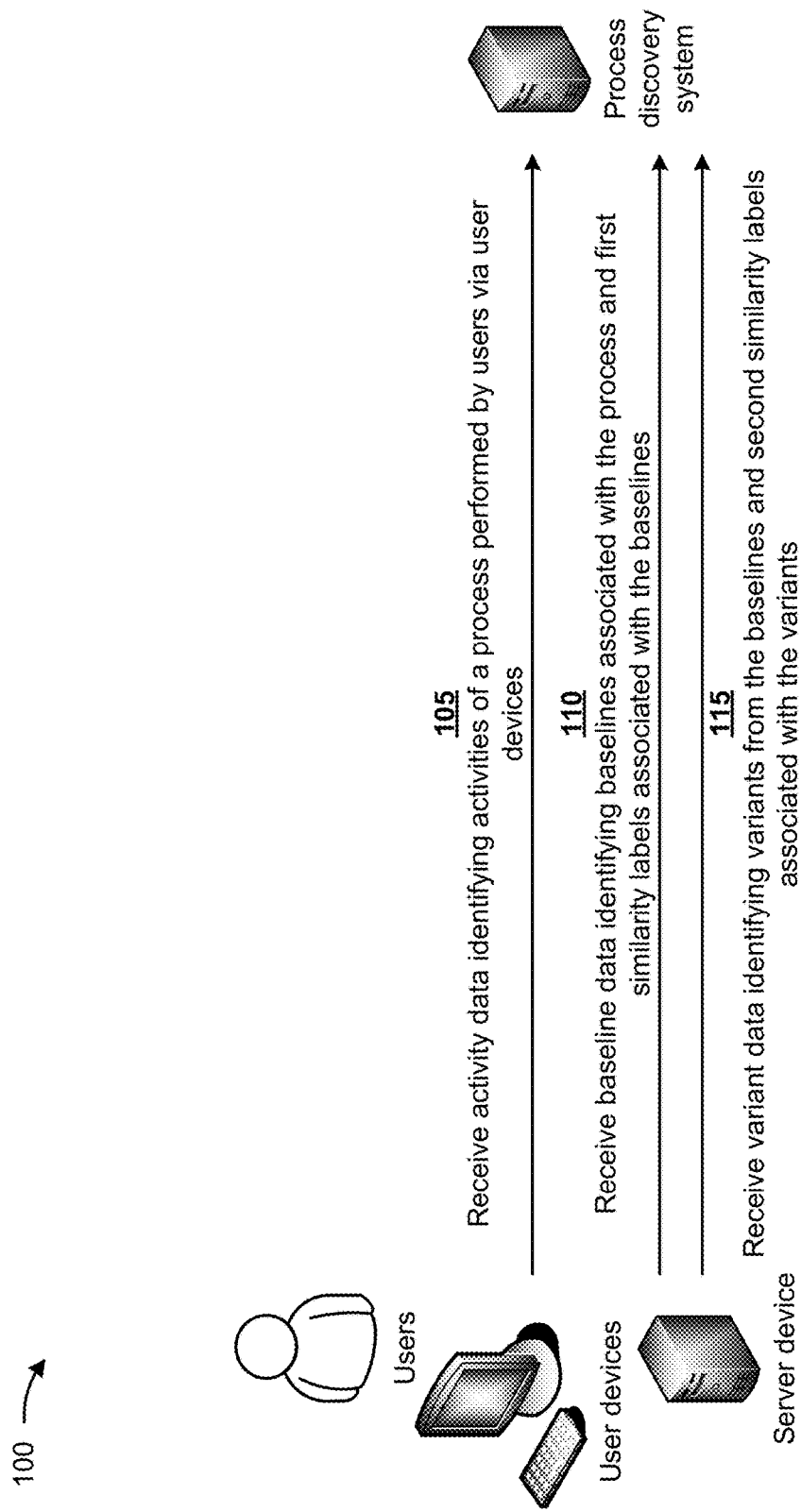
FIGS. 1A-1F are diagrams of an example implementation described herein.

The following detailed description of example implementations refers to the accompanying drawings. The same reference numbers in different drawings may identify the same or similar elements.

Process mapping may enable organizations and businesses to gain better understanding of a process and to improve process efficiency. A process diagram or map provides insight into a process, helps teams brainstorm ideas for process improvement, increases communication, and provides process documentation. Process mapping may identify bottlenecks, repetition, and delays associated with a process. Information to generate a process map is manually obtained by observing people performing a process. However, manually observing people performing a process is time consuming, expensive, and inaccurate. This, in turn, wastes computing resources (e.g., processing resources, memory resources, communication resources, and/or the like), networking resources, and/or the like associated with collecting and inputting inaccurate information for generating an inaccurate process map, creating an inaccurate process based on an inaccurate process map, implementing an inaccurate process, and/or the like.

Some implementations described herein provide a process discovery system that receives activity data identifying activities of a process performed by users via user devices. In some implementations, the process discovery system receives baseline data identifying baselines associated with the process and first similarity labels associated with the baselines, and receives variant data identifying variants from the baselines and second similarity labels associated with the variants. The process discovery system applies a sequence alignment model, to the activity data and the baseline data, to determine first similar sequences associated with the activities and the baselines, and applies the sequence alignment model, to the activity data and the variant data, to determine second similar sequences associated with the activities and the variants. In some implementations, the process discovery system determines, based on the first similarity labels in the baseline data, and based on the first similar sequences, first label data identifying first labels for the activities, and determines, based on the second similarity labels in the variant data, and based on the second similar sequences, second label data identifying second labels for the activities. Accordingly, the process discovery system generates a process diagram based on the activity data, the first label data, and the second label data. In some implementations, the process discovery system performs one or more actions based on the process diagram, such as providing the process diagram for display to one or more of the user devices.

In this way, the process discovery system identifies a process and generates a process diagram. The process discovery system may automatically identify and visualize processes as the processes actually occur, without manual observation of people performing the processes. The process discovery system provides insights into any process executed using user devices. The insights may enable the process discovery system to suggest process improvements, which make processes more robust and efficient. This, in turn, conserves computing resources, networking resources, and/or the like that would otherwise have been wasted in collecting and inputting inaccurate information for generating an inaccurate process diagram, creating an inaccurate process based on an inaccurate process diagram, implementing an inaccurate process, and/or the like.

FIGS. 1A-1F are diagrams of an example 100 associated with identifying a process and generating a process diagram. As shown in FIGS. 1A-1F, example 100 includes one or more user devices (e.g., associated with one or more users), one or more server devices, and a process discovery system. The one or more user devices may include laptop computers, mobile telephones, desktop computers, and/or the like utilized by the users. The one or more server devices may include devices that collect and/or provide data, as described herein. The process discovery system may include a system that identifies a process (e.g., performed by the users via the user devices) and generates a process diagram. In some implementations, the one or more user devices, the one or more server devices, and/or the process discovery system may be connected via a network, such as a wired network (e.g., the Internet or another data network), a wireless network (e.g., a wireless local area network, a wireless wide area network, a cellular network, and/or the like), and/or the like.

As shown in FIG. 1A, and by reference number 105, the process discovery system may receive activity data from the one or more user devices. The activity data may identify activities of a process performed by users of the one or more devices when the users are using the one or more user devices. A process may include, for example, activities (e.g., actions or steps) taken in order to achieve a particular result (e.g., to perform a particular task). Activities may include one or more user interactions with a user interface of the user device that occur when a user performs a process using the user device. The one or more user interactions may include one or more keyboard clicks, one or more mouse clicks, one or more touchscreen taps, one or more mouse wheel scrolls, one or more voice commands, and/or one or more visual commands (e.g., hand gesture commands and/or facial gesture commands), among other examples. In some implementations, the activities may include, for example, information associated with the process that is presented to the user (e.g., information associated with the process that is presented via a display, a speaker, and/or a haptic feedback component, among other examples, of the user device). In some implementations, the one or more user devices may capture and provide the activity data to the process discovery system (e.g., via the network that connects the one or more user devices and the process discovery system).

In some implementations, the process discovery system may preprocess the activity data to determine context associated with the activities of the process performed by the users via the user devices. For example, the process discovery system may determine, based on one or more user interactions identified in the activity data, a series of characters input by a user into a user device, and may process the series of characters to determine one or more words input by the user. As another example, the process discovery system may determine, based on information that is presented to a user of a user device (e.g., via a display, a speaker, and/or a haptic feedback component, among other examples, of the user device), one or more images, sounds, vibrations, and/or the like, that are presented to the user, and may process the one or more images (e.g., using an optical character recognition technique), sounds (e.g., using a natural language processing technique), vibrations (e.g., using a vibration analysis technique) to determine one or more words or other information presented to the user.

As shown in FIG. 1A, and by reference number 110, the process discovery system may receive baseline data from the one or more server devices. The baseline data may identify baselines (e.g., baseline activities) associated with the process. For example, the baseline data may include historical data identifying historical activities associated with the process (e.g., preferred historical activities associated with the process and/or a preferred sequence associated with the historical activities). The baseline data may include first similarity labels associated with the baselines. A first similarity label may provide a description and/or an identifier for a baseline or a set of baselines. Example first similarity labels include "open document," "input part numbers," "select order by date," "copy text serial number," and/or "paste serial number," among other examples. In some implementations, the one or more server devices may maintain and/or store the baseline data in a data structure (e.g., a database, an electronic file system, and/or one or more electronic files, among other examples) and may provide the baseline data to the process discovery system (e.g., via the network that connects the one or more server devices and the process discovery system).

As shown in FIG. 1A, and by reference number 115, the process discovery system may receive variant data from the one or more server devices. The variant data may identify variants from the baselines. For example, the variant data may include historical data identifying historical variants from historical activities of the process (e.g., different historical activities associated with the process and/or a different sequence of historical activities than the preferred historical activities associated with the process and/or the preferred sequence associated with the historical activities included in the baseline data). The variant data may include second similarity labels associated with the variants. A second similarity label may provide a description and/or identifier for a variant or a set of variants (e.g., in a similar manner as that described above for the first similarity labels associated with the baselines). In some implementations, the one or more server devices may maintain and/or store the variant data in a data structure (e.g., that is the same or different than the data structure described above) and may provide the variant data to the process discovery system (e.g., via the network that connects the one or more server devices and the process discovery system).

Figure 1B:
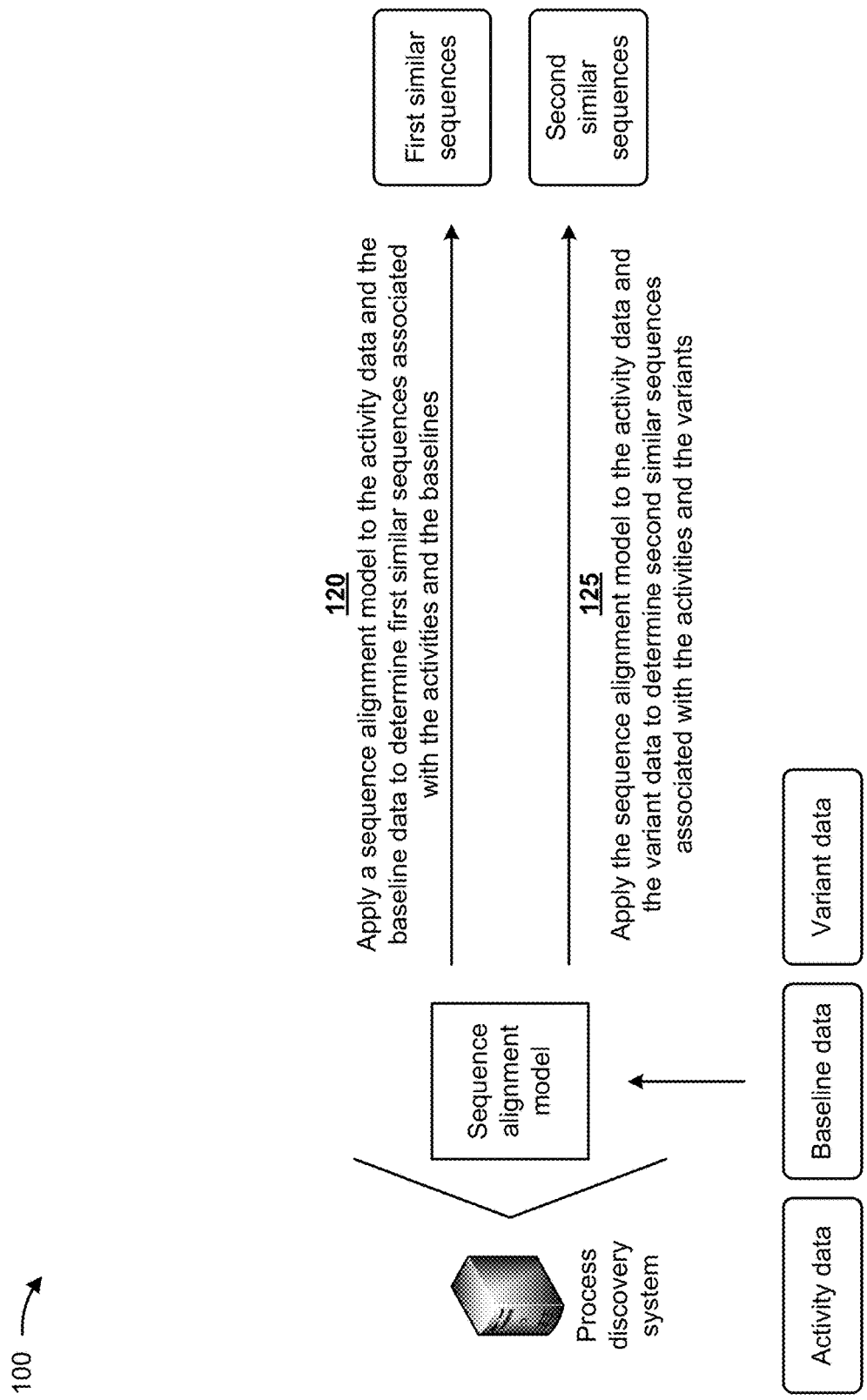

Turning to FIG. 1B and reference number 120, the process discovery system may apply a sequence alignment model to the activity data and the baseline data to determine one or more first similar sequences associated with the activities and the baselines. For example, applying the sequence alignment model may include initializing a scoring matrix to zero to generate an initialized scoring matrix (e.g., initializing a two-dimensional scoring matrix to zero, where the activity data is associated with a first dimension of the scoring matrix and the baseline data is associated with a second dimension of the scoring matrix), populating the initialized scoring matrix based on the activity data and the baseline data to generate a populated scoring matrix (e.g., where an entry of the initialized scoring matrix is populated with a comparison score indicating an amount of similarity between an activity and a baseline associated with the entry), and performing a traceback of the populated scoring matrix (e.g., identifying an entry in the populated scoring matrix with a maximum comparison score and "tracing back" a path to other high comparison scores in the populated scoring matrix) to determine the one or more first similar sequences associated with the activities and the baselines. In some implementations, the sequence alignment model may be a Smith-Waterman model. In some implementations, the Smith-Waterman model may be modified to utilize a repeated search to determine the one or more similar sequences. In some implementations, the Smith-Waterman model may be modified to utilize a non-binary match or mismatch scheme (e.g., for determining the comparison scores of the populated scoring matrix). In some implementations, the Smith-Waterman model may be modified to utilize more than two types of combinations (e.g., of activities and/or baselines) as a match (e.g., for determining the comparison scores of the populated scoring matrix) and/or to utilize a bonus rewards scheme for determining the one or more first similar sequences.

As further shown in FIG. 1B, and by reference number 125, the process discovery system may apply the sequence alignment model to the activity data and the variant data to determine one or more second similar sequences associated with the activities and the variants (e.g., in a similar manner as that described above in relation to reference number 120).

For example, applying the sequence alignment model may include initializing a scoring matrix (e.g., a different scoring matrix than the scoring matrix described above) to zero to generate an initialized scoring matrix, populating the initialized scoring matrix based on the activity data and the variant data to generate a populated scoring matrix, and performing a traceback of the populated scoring matrix to determine the one or more second similar sequences associated with the activities and the variants. In some implementations, the sequence alignment model may be a modified Smith-Waterman model and/or may be otherwise modified, as described above, to determine the one or more second similar sequences.

Figure 1C:
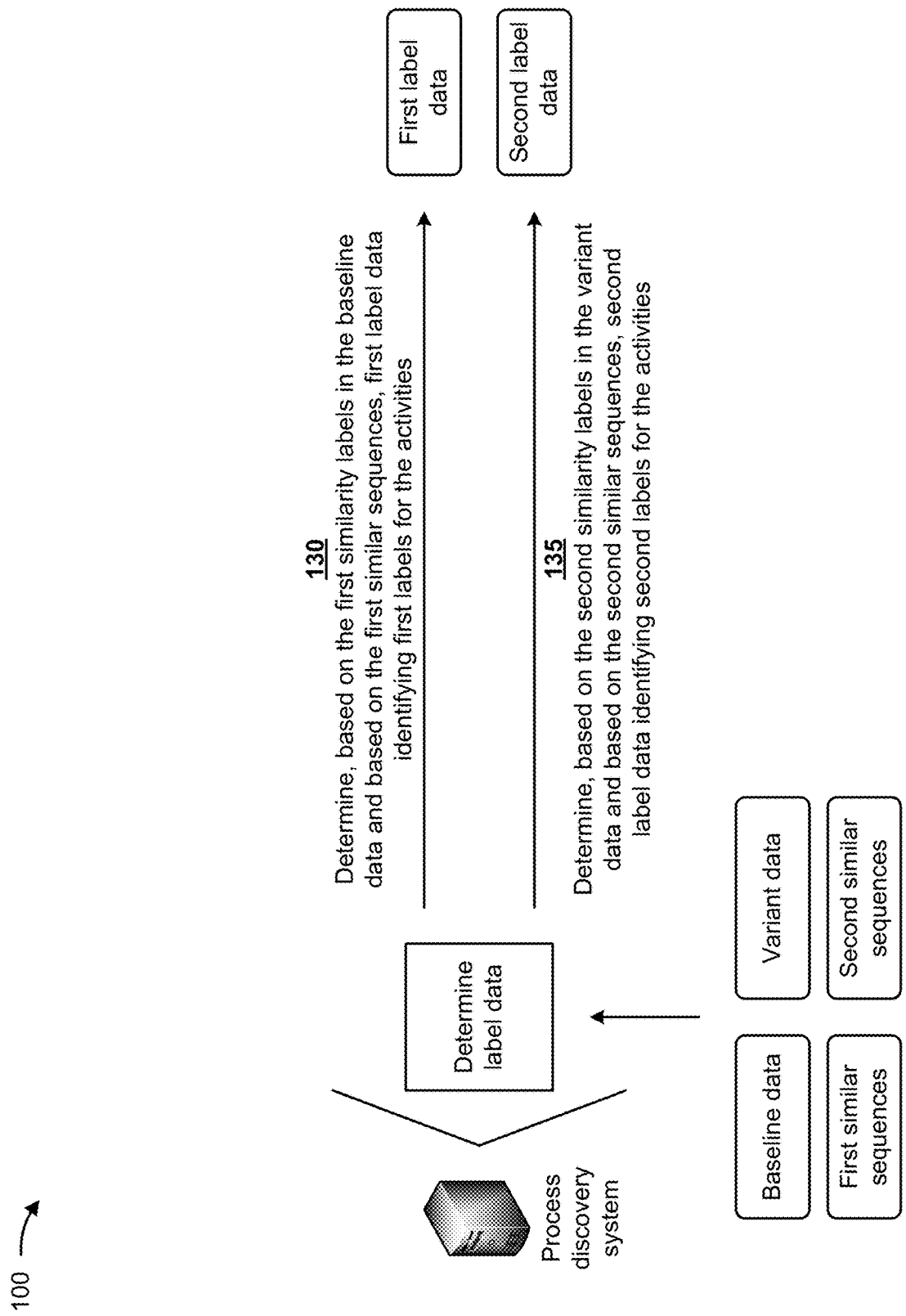

Turning to FIG. 1C and reference number 130, the process discovery system may determine first label data identifying first labels for the activities (e.g., based on the first similarity labels in the baseline data and/or based on the one or more first similar sequences). For example, the process discovery system may identify a set of baselines, of the baselines included in the baseline data, that is associated with the one or more first similar sequences and may identify a set of first similarity labels, of the first similarity labels included in the baseline data, that is associated with the set of baselines. Accordingly, the process discovery system may cause the first labels for the activities to include the set of first similarity labels.

As further shown in FIG. 1C, and by reference number 135, the process discovery system may determine second label data identifying second labels for the activities (e.g., based on the second similarity labels in the variant data and based on the one or more second similar sequences). For example, the process discovery system may identify a set of variants, of the variants included in the variant data, that is associated with the one or more second similar sequences and may identify a set of second similarity labels, of the second similarity labels included in the variant data, that is associated with the set of variants. Accordingly, the process discovery system may cause the second labels for the activities to include the set of second similarity labels.

Figure 1D:
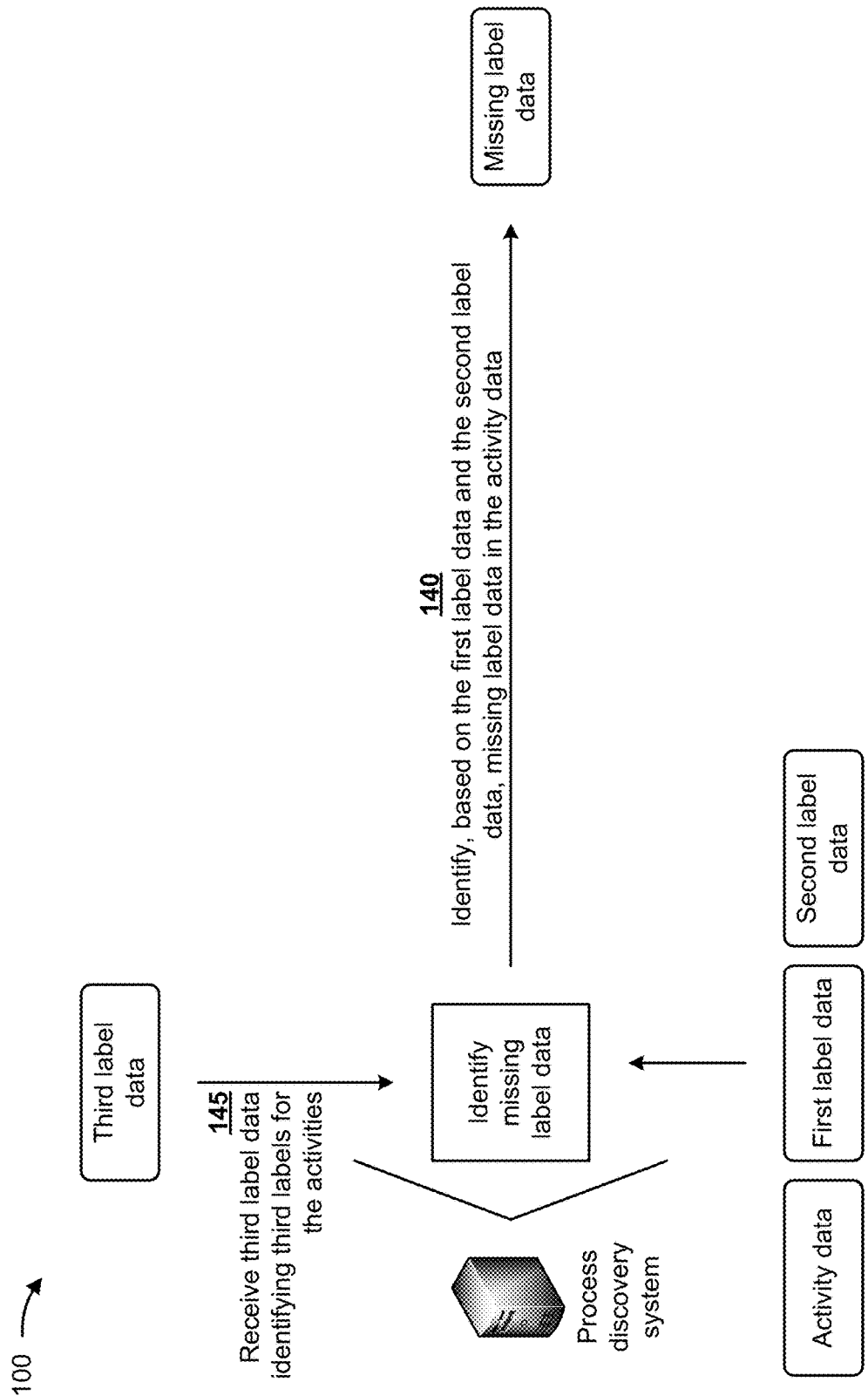

Turning to FIG. 1D and reference number 140, in some implementations, the process discovery system may identify missing label data in the activity data (e.g., based on the first label data and the second label data). For example, the process discovery system may determine that one or more activities included in the activity data are not associated with the first label data or the second label data (e.g., the one or more activities are not associated with any first label of the first label data or any second label of the second label data). Accordingly, the missing label data may identify the one or more activities as missing a label.

As further shown in FIG. 1D, and by reference number 145, the process discovery system may receive third label data identifying third labels for the activities included in the activity data. A third label may provide a description and/or identifier for an activity or a set of activities. In some implementations, the third label data corresponds to the missing label data. For example, the third label data may identify third labels for the one or more activities that are missing a label (e.g., the one or more activities that are not associated with the first label data or the second label data).

In some implementations, the process discovery system may send (e.g., via the network that connects the one or more user devices and the process discovery system) the activity data and/or the missing label data to a user device of the one or more user devices. The user device may present (e.g., display on a display screen of the user device) the activity data and/or the missing label data to a user of the user device. The user, in response, may interact with a user interface of the user device to input third labels associated with activities of the activity data and/or the missing label data. Accordingly, the user device may send (e.g., via the network) the third label data that includes the third labels to the process discovery system. In this way, the process discovery system may obtain third label data for activities that are not associated with the first label data or the second label data.

Figure 1E:
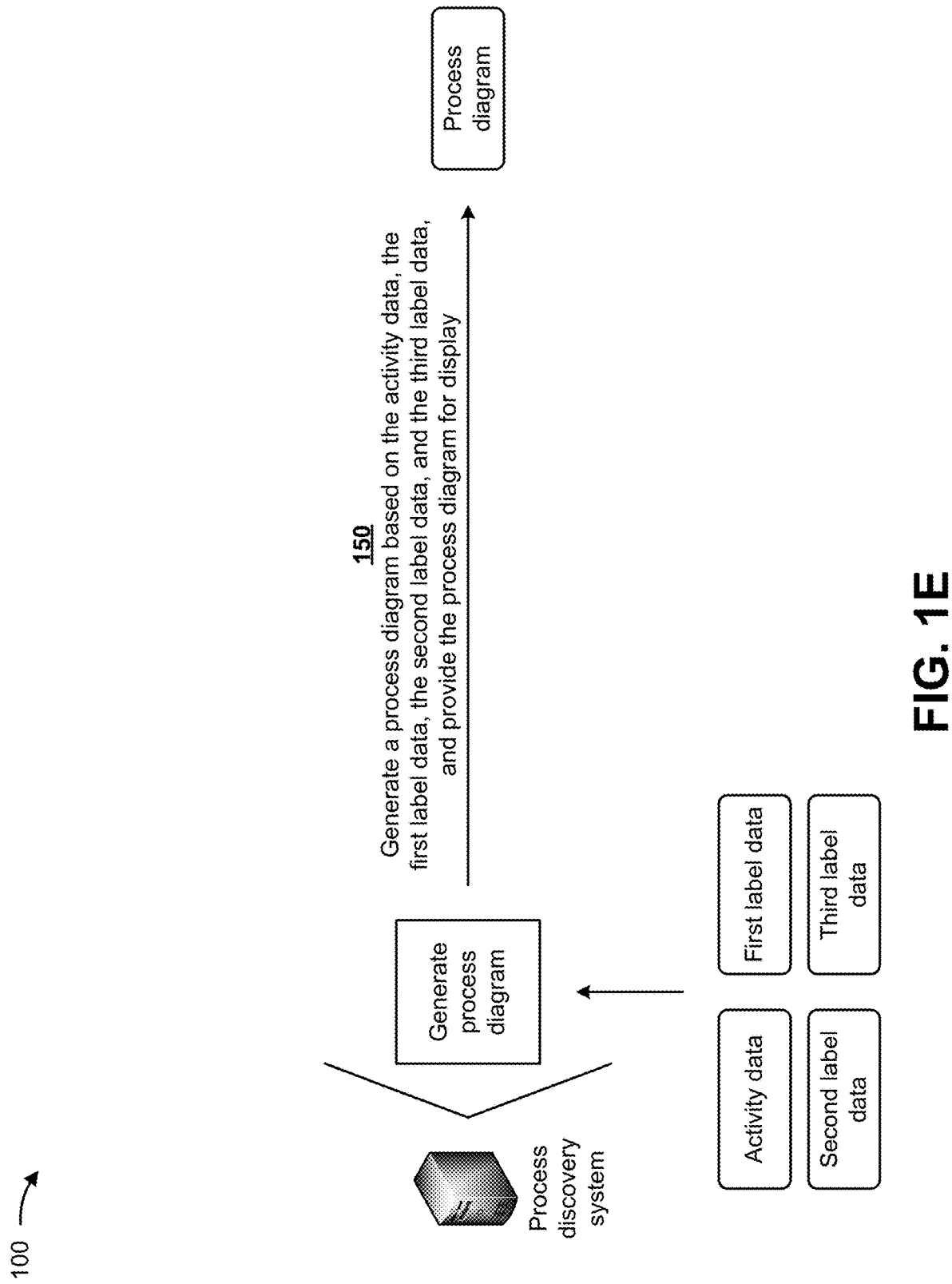

Turning to FIG. 1E and reference number 150, the process discovery system may generate a process diagram based on the activity data, the first label data, the second label data, and/or the third label data. The process diagram may indicate a sequence of the activities identified in the activity data with particular activities and/or sets of activities labeled with first labels of the first label data, second labels of the second label data, and/or third labels of the third label data. For example, the process diagram may illustrate a plurality of nodes respectively associated with activities identified in the activity data and one or more links (e.g., one or more directed links) that connect the plurality of nodes to form a flowchart (e.g., that indicates the sequence of activities). The process diagram may illustrate a first label, a second label, and/or a third label next to a particular node or a set of particular nodes to indicate that the first label, the second label, and/or the third label are associated with the particular node and/or the set of particular nodes (and, accordingly, the respective activities associated with the particular node and/or the set of particular nodes). In some implementations, the process discovery system may provide the process diagram for display. For example, the process discovery system may send (e.g., via the network that connects the one or more user devices and the process discovery system) the process diagram to at least one user device, of the one or more user devices, to cause a display screen of the at least one user device to display the process diagram.

Figure 1F:
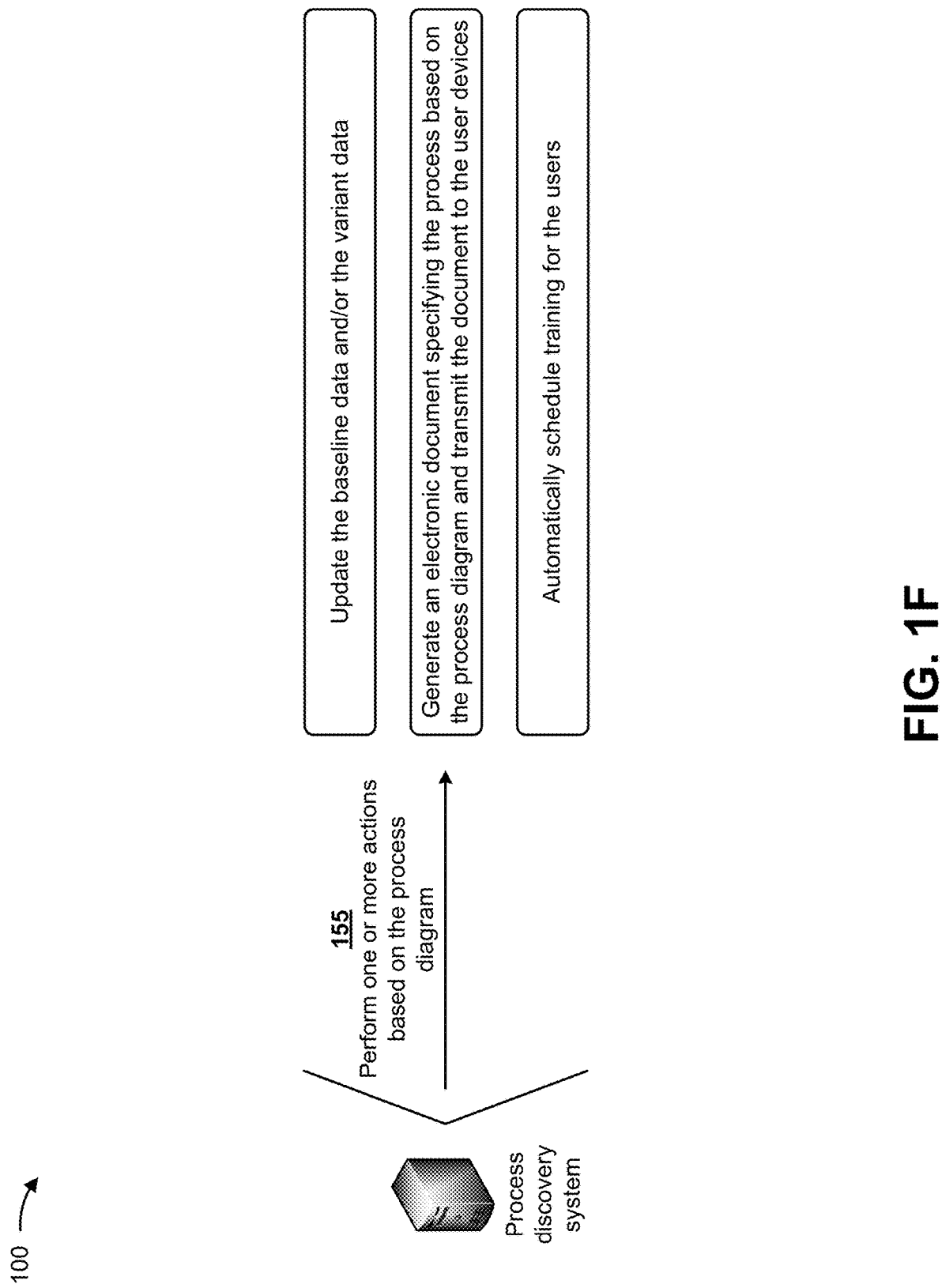

As shown in FIG. 1F, and by reference number 155, the process discovery system may perform one or more actions based on the process diagram. In some implementations, the one or more actions may include updating the baseline data and/or the variant data based on the process diagram. For example, the process discovery system may determine, based on the process diagram, a set of activities associated with the process and may add the set of activities (and labels associated with the set of activities) to the baseline data or the variant data (e.g., by sending the set of activities to the one or more network devices to cause the network devices to updated the baseline data or the variant data). As another example, the process discovery system may determine that the set of activities is not included in the baseline data for the process and may determine that the set of activities provides a preferred result associated with the process (e.g., in terms of an amount of time to perform the process, an amount of activities to perform the process, and/or an amount of repetition of activities to perform the process, among other examples) as opposed to an existing set of activities in the baseline data associated with the process. Accordingly, the process discovery system may cause the baseline data to include the set of activities associated with the process (and labels associated with the set of activities) and/or to move the existing set of activities (and labels associated with the existing set of activities) from the baseline data to the variant data. In this way, the process discovery system may automatically update the baseline data and the variant data, which facilitates future generation of accurate process diagrams.

In some implementations, the one or more actions include generating an electronic document specifying the process based on the process diagram and transmitting the document to the one or more user devices (e.g., via the network that connects the one or more server devices and the process discovery system). A user device that receives the electronic document may cause the electronic document to be displayed (e.g., as a checklist) when a user of the user device performs, or is about to perform, the process. In some implementations, the one or more actions include automatically scheduling training for users about the process based on the process diagram. For example, the process discovery system may automatically create and send an electronic calendar invitation that includes the process diagram to a user device associated with a trainer and a user device associated with a trainee. In this way, the process discovery system facilitates the trainer training the trainee about the process using the process diagram, which increases a likelihood that the trainee will perform the process according to the process diagram. This, in turn, increases a likelihood that the process is performed effectively and/or efficiently, which reduces an amount of time and/or computing resources (e.g., processing resources, memory resources, networking resources, and/or the like) of the trainee's user device that need to be used to perform the process.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
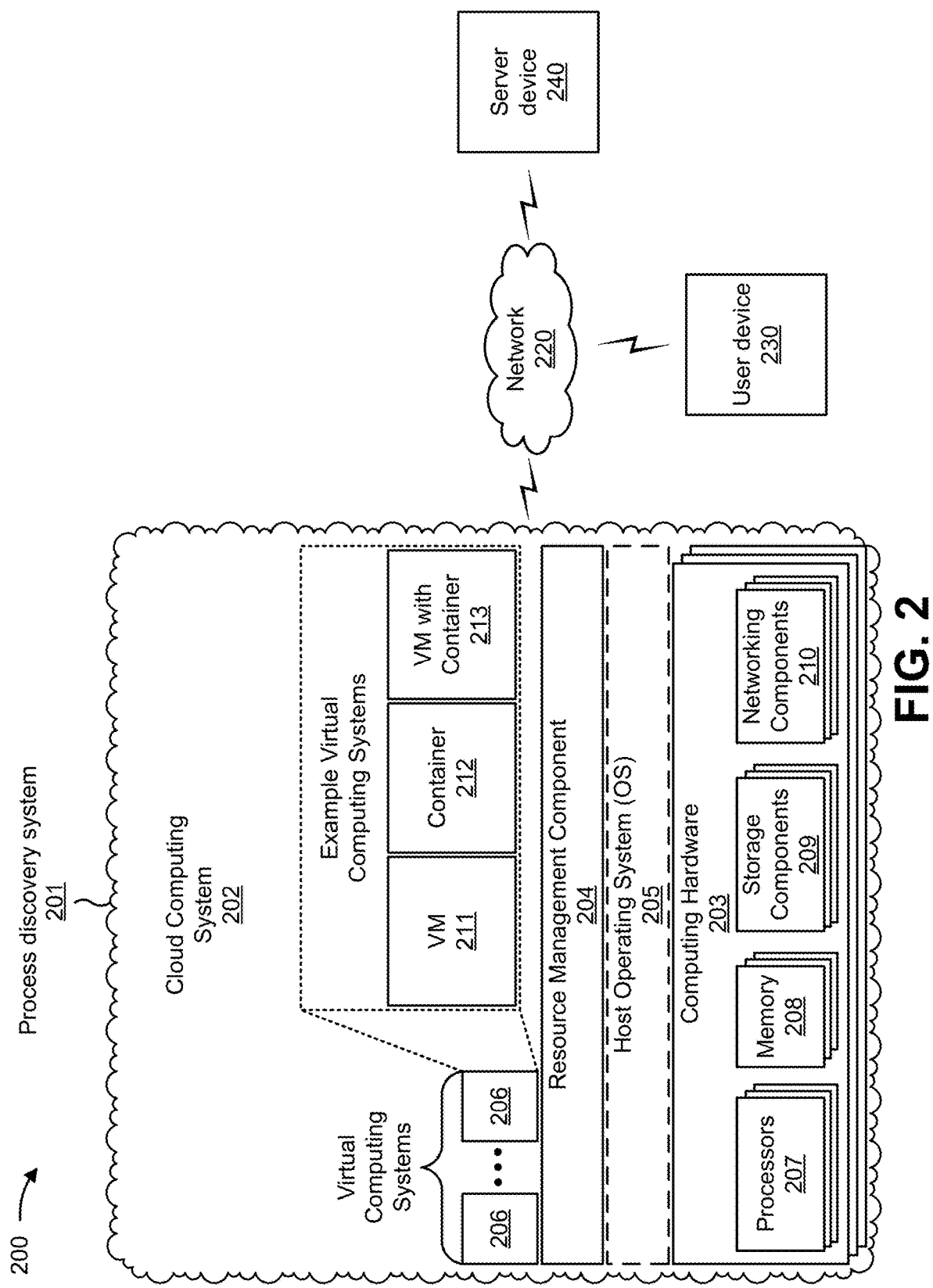
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a process discovery system 201, which may include one or more elements of and/or may execute within a cloud computing system 202. The cloud computing system 202 may include one or more elements 203-313, as described in more detail below. As further shown in FIG. 2, environment 200 may include a network 220, a user device 230, and/or a server device 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the process discovery system 201 may include one or more elements 203-313 of the cloud computing system 202, may execute within the cloud computing system 202, and/or may be hosted within the cloud computing system 202, in some implementations, the process discovery system 201 may not be cloud-based (e.g., may be implemented outside of a cloud computing system) or may be partially cloud-based. For example, the process discovery system 201 may include one or more devices that are not part of the cloud computing system 202, such as device 300 of FIG. 3, which may include a standalone server or another type of computing device. The process discovery system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

User device 230 includes one or more devices capable of receiving, generating, storing, processing, and/or providing information associated with activities of a process performed by the users, as described elsewhere herein. User device 230 may include a communication device and/or a computing device. For example, user device 230 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 230 may communicate with one or more other devices of environment 200, as described elsewhere herein. In some implementations, user device 230 may provide activity data associated with a process to process discovery system 201.

Server device 240 includes one or more devices capable of receiving, generating, storing, processing, providing, and/or routing information associated with process baseline data and/or process variant data, as described elsewhere herein. Server device 240 may include a communication device and/or a computing device. For example, server device 240 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 240 may communicate with one or more other devices of environment 200, as described elsewhere herein. In some implementations, server device 240 may provide baseline data and/or variant data associated with a process to process discovery system 201.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
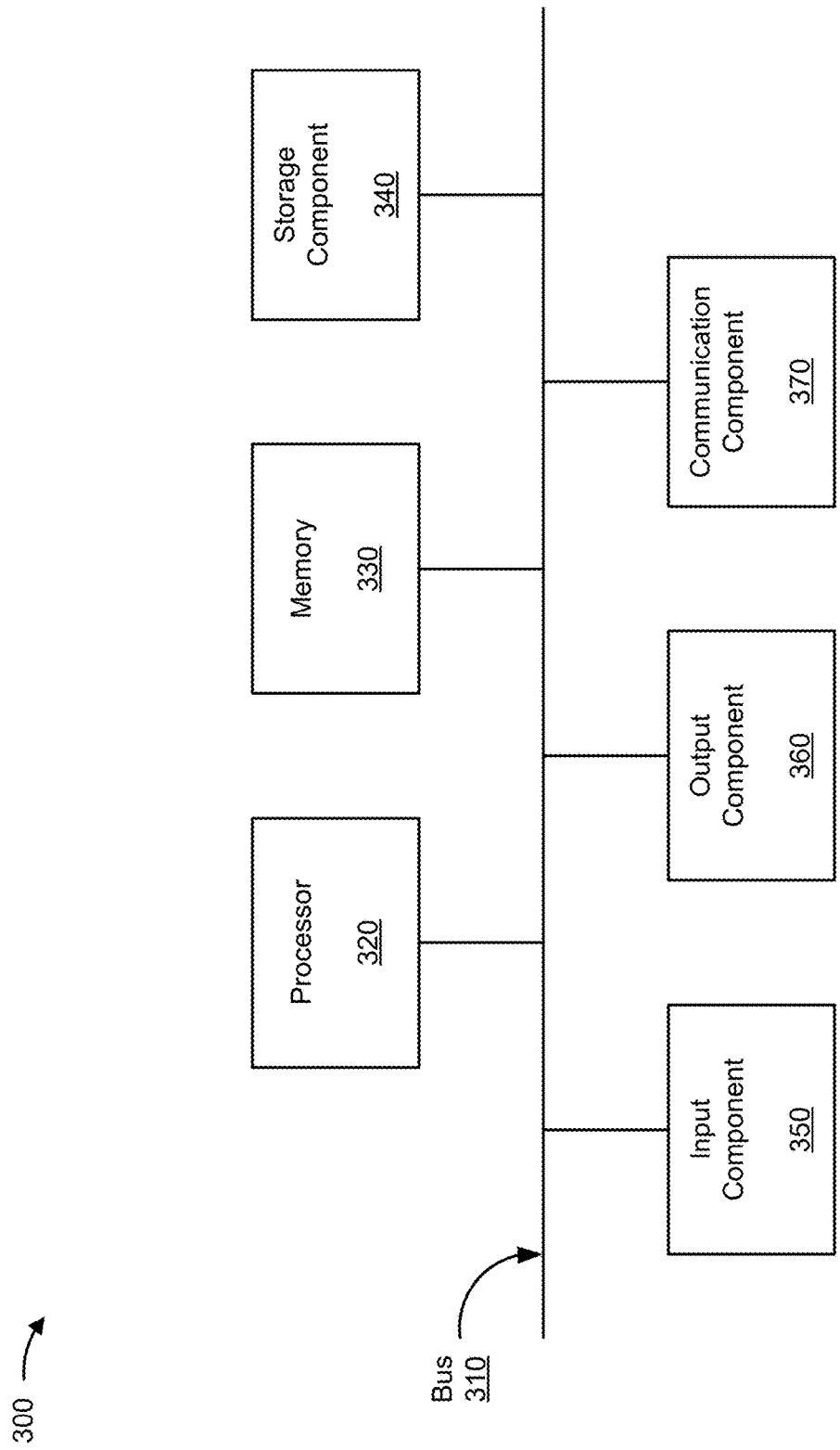
FIG. 3 is a diagram of example components of one or more devices of FIG. 3.

FIG. 3 is a diagram of example components of a device 300, which may correspond to process discovery system 201, user device 230, and/or server device 240. In some implementations, process discovery system 201, user device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
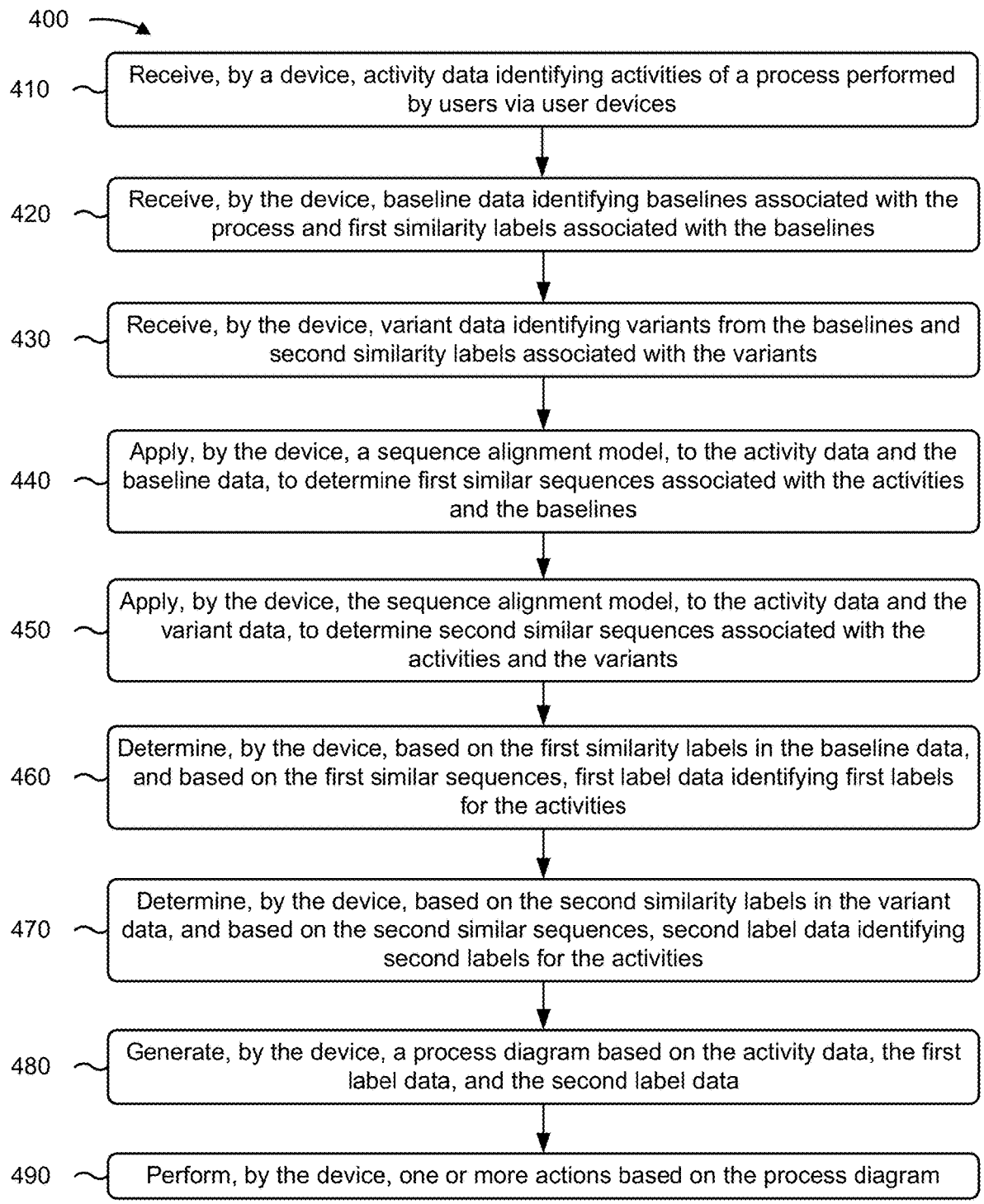
FIG. 4 is a flowchart of an example process for identifying a process and generating a process diagram.

FIG. 4 is a flowchart of an example process 400 for identifying a process and generating a process diagram. In some implementations, one or more process blocks of FIG. 4 may be performed by a device (e.g., process discovery system 201). In some implementations, one or more process blocks of FIG. 4 may be performed by another device or a group of devices separate from or including the device, such as a server device (e.g., server device 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving activity data identifying activities of a process performed by users via user devices (block 410). For example, the device may receive activity data identifying activities of a process performed by users via user devices, as described above.

As further shown in FIG. 4, process 400 may include receiving baseline data identifying baselines associated with the process and first similarity labels associated with the baselines (block 420). For example, the device may receive baseline data identifying baselines associated with the process and first similarity labels associated with the baselines, as described above.

As further shown in FIG. 4, process 400 may include receiving variant data identifying variants from the baselines and second similarity labels associated with the variants (block 430). For example, the device may receive variant data identifying variants from the baselines and second similarity labels associated with the variants, as described above.

As further shown in FIG. 4, process 400 may include applying a sequence alignment model, to the activity data and the baseline data, to determine first similar sequences associated with the activities and the baselines (block 440). For example, the device may apply a sequence alignment model, to the activity data and the baseline data, to determine first similar sequences associated with the activities and the baselines, as described above.

As further shown in FIG. 4, process 400 may include applying the sequence alignment model, to the activity data and the variant data, to determine second similar sequences associated with the activities and the variants (block 450). For example, the device may apply the sequence alignment model, to the activity data and the variant data, to determine second similar sequences associated with the activities and the variants, as described above.

As further shown in FIG. 4, process 400 may include determining based on the first similarity labels in the baseline data, and based on the first similar sequences, first label data identifying first labels for the activities (block 460). For example, the device may determine based on the first similarity labels in the baseline data, and based on the first similar sequences, first label data identifying first labels for the activities, as described above.

As further shown in FIG. 4, process 400 may include determining based on the second similarity labels in the variant data, and based on the second similar sequences, second label data identifying second labels for the activities (block 470). For example, the device may determine based on the second similarity labels in the variant data, and based on the second similar sequences, second label data identifying second labels for the activities, as described above.

As further shown in FIG. 4, process 400 may include generating a process diagram based on the activity data, the first label data, and the second label data (block 480). For example, the device may generate a process diagram based on the activity data, the first label data, and the second label data, as described above.

As further shown in FIG. 4, process 400 may include performing one or more actions based on the process diagram (block 490). For example, the device may perform one or more actions based on the process diagram, as described above.

In some implementations, the sequence alignment model includes a modified Smith-Waterman model.

In some implementations, process 400 includes identifying, based on the first label data and the second label data, missing label data in the activity data, receiving third label data identifying third labels for the activities, wherein the third label data corresponds to the missing label data, and generating the process diagram based on the activity data, the first label data, the second label data, and the third label data.

In some implementations, performing the one or more actions comprises generating an electronic document specifying the process, based on the process diagram, and transmitting the electronic document to the user devices via a network.

In some implementations, performing the one or more actions comprises one or more of updating the baseline data or updating the variant data based on the process diagram.

In some implementations, performing the one or more actions comprises providing the process diagram for display to one or more of the user devices.

In some implementations, applying the sequence alignment model, to the activity data and the baseline data, to determine the first similar sequences associated with the activities and the baselines, comprises initializing a scoring matrix to zero to generate an initialized scoring matrix, populating the initialized scoring matrix with the activity data and the baseline data, to generate a populated scoring matrix, and performing a traceback of the populated scoring matrix to determine the first similar sequences associated with the activities and the baselines.

In some implementations, process 400 includes initializing a scoring matrix to zero to generate an initialized scoring matrix, populating the initialized scoring matrix with the activity data and the variant data, to generate a populated scoring matrix, and performing a traceback of the populated scoring matrix to determine the second similar sequences associated with the activities and the variants.

In some implementations, the sequence alignment model is modified to utilize more than two types of combinations as a match and to utilize a bonus rewards scheme for determining match scores.

In some implementations, the sequence alignment model is modified to utilize a repeated search for alignments and to utilize a non-binary match or mismatch scheme.

In some implementations, the variant data includes historical data identifying historical variants from historical activities of the process.

In some implementations, process 400 includes preprocessing the activity data to determine context associated with the activities of the process performed by the users via the user devices.

In some implementations, the baseline data includes historical data identifying historical activities of the process.

In some implementations, performing the one or more actions comprises generating an electronic document specifying the process, based on the process diagram, and transmitting the document to the user devices via a network, or automatically scheduling training for the users about the process.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
Figure 5C:
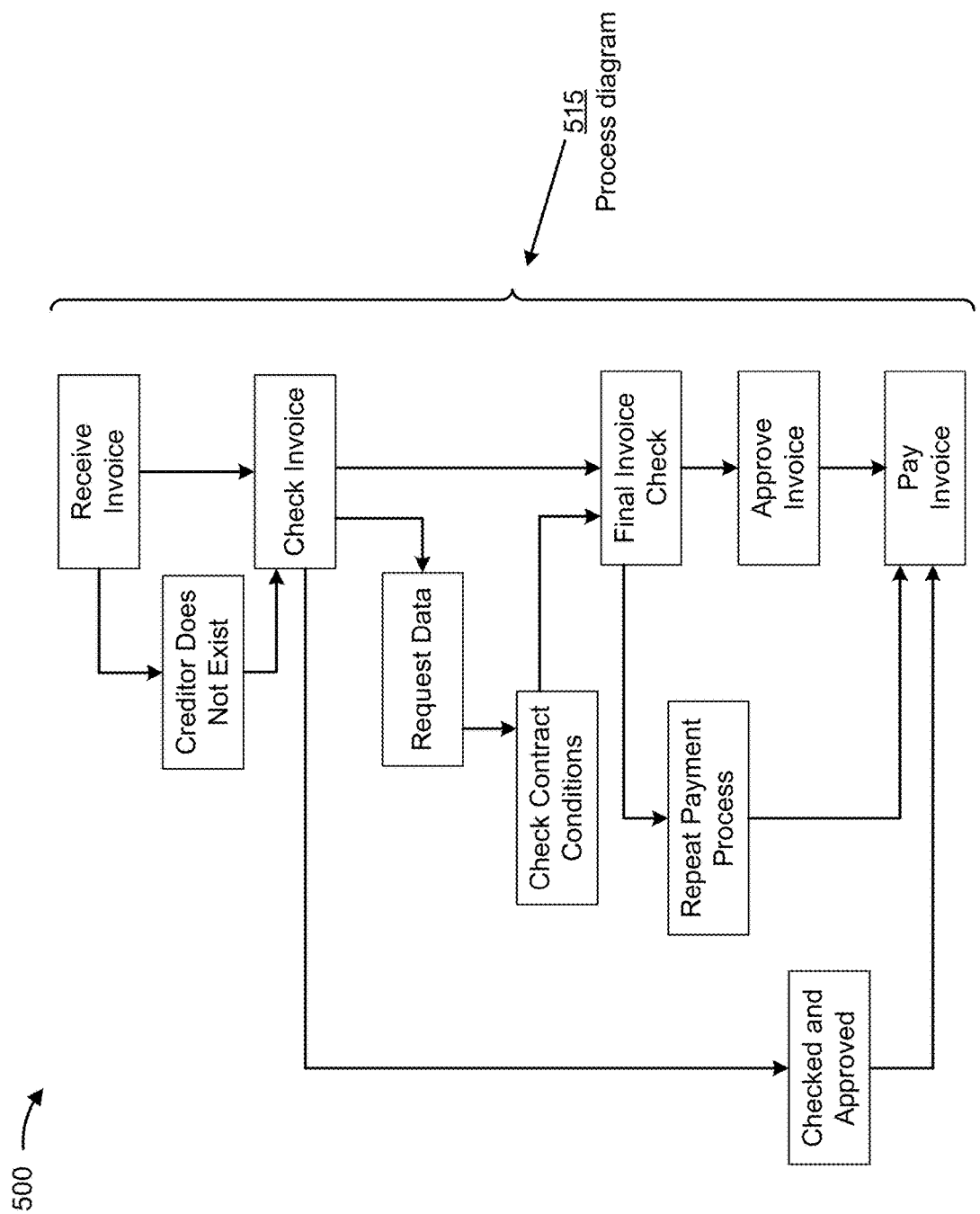

FIGS. 5A-5C illustrates examples of a user interface 500 associated with the process discovery system described herein. In some implementations, as described herein in relation to FIG. 1A and reference number 105, the process discovery system may receive activity data from one or more user devices. Accordingly, the process discovery system may provide the user interface 500 (e.g., that is accessible via a particular user device of an administrator of the process discovery system) that allows the administrator to view information associated with the activity data. In some implementations, the process discovery system may provide, via the user interface 500 and based on the activity data, a visualization of individual activities of a process performed by the one or more user devices. For example, as shown in FIG. 5A and by reference number 505, the process discovery system may provide screenshots of the individual activities of the process performed by the one or more devices to be displayed within a visualization window of the user interface 500.

In some implementations, the process discovery system may provide, via the user interface 500 and based on the activity data, respective reporting associated with a performance of the process by the one or more user devices. For example, as shown in FIG. 5B and by reference number 510, the process discovery system may provide links to individual reports associated with the process for each device of the one or more user devices within a reporting window of the user interface 500. As further shown in FIG. 5B, for each report associated with a user device, the process discovery system may provide a name of the report (e.g., a unique identifier), a number of activities associated with the process performed by the user device, a start date and time and end date and time (e.g., that indicates a total amount of time to perform the activities) associated with the process performed by the user device, an identifier (shown as the "Agent" label) identifying the user or a user of the user device, and/or an indicator (shown as "Baseline Coverage %") that identifies how similar the activities are to baseline activities associated with the process.

In some implementations, the process discovery system may provide, via the user interface 500, a process diagram associated with the process (e.g., a process diagram that was generated by the process discovery system based on the activity data, as described above in relation to FIGS. 1A-1E). For example, as shown in FIG. 5C and by reference number 515, the process discovery system may provide the process diagram within a process diagram window of the user interface 500. As further shown in FIG. 5C, the process discovery system may depict, via the user interface 500, a plurality of nodes of the process diagram (e.g., that are respectively associated with activities identified in the activity data) and one or more links (e.g., one or more directed links) that connect the plurality of nodes. The process discovery system may depict, via the user interface 500, labels associated with individual nodes or sets of nodes. Accordingly, in this way, the user interface 500 may be used by the administrator to monitor input (e.g., activity data) to the process discovery system and output (e.g., a process diagram) of the process discovery system. As indicated above, FIGS. 5A-5C are provided as an example. Other examples may differ from what is described with regard to FIGS. 5A-5C.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device and from user devices, activity data identifying activities of a process performed by users interacting with one or more user interfaces via the user devices,
wherein the activities include one or more of clicks, taps, scrolls, voice commands, or visual commands based on the users interacting with the one or more user interfaces;
preprocessing, by the device, the activity data to determine a context associated with the activities of the process performed by the users,
wherein preprocessing the activity data comprises;
determining, based on information that is presented to the users via one or more hardware components of the user devices, one or more images, sounds, or vibrations that are presented to the users, and
processing the one or more images, sounds, or vibrations to determine one or more words or other information presented to the users;
receiving, by the device, baseline data identifying baselines associated with the process and first similarity labels associated with the baselines;
receiving, by the device, variant data identifying variants from the baselines and second similarity labels associated with the variants;
applying, by the device, a sequence alignment model, to the activity data and the baseline data, to determine first similar sequences associated with the activities and the baselines;
applying, by the device, the sequence alignment model, to the activity data and the variant data, to determine second similar sequences associated with the activities and the variants;
determining, by the device, based on the first similarity labels in the baseline data, and based on the first similar sequences, first label data identifying first labels for the activities;
determining, by the device, based on the second similarity labels in the variant data, and based on the second similar sequences, second label data identifying second labels for the activities;
generating, by the device, a process diagram based on the activity data, the first label data, and the second label data; and
performing, by the device, one or more actions based on the process diagram,
wherein performing the one or more actions comprises:
generating an electronic document specifying the process, based on the process diagram, and
automatically creating and sending an electronic calendar invitation that includes the electronic document, including the process diagram, to a user device associated with a trainer or trainee.

2. The method of claim 1, wherein the sequence alignment model includes a modified Smith-Waterman model.

3. The method of claim 1, further comprising:
identifying, based on the first label data and the second label data, missing label data in the activity data;
receiving third label data identifying third labels for the activities,
wherein the third label data corresponds to the missing label data; and
generating the process diagram based on the activity data, the first label data, the second label data, and the third label data.

4. The method of claim 1, wherein performing the one or more actions comprises one or more of:
updating the baseline data or the variant data based on the process diagram.

5. The method of claim 1, wherein performing the one or more actions comprises:
providing the process diagram for display to one or more of the user devices.

6. The method of claim 1, wherein applying the sequence alignment model, to the activity data and the baseline data, to determine the first similar sequences associated with the activities and the baselines comprises:
initializing a scoring matrix to zero to generate an initialized scoring matrix;
populating the initialized scoring matrix with the activity data and the baseline data, to generate a populated scoring matrix; and
performing a traceback of the populated scoring matrix to determine the first similar sequences associated with the activities and the baselines.

7. A device, comprising:
one or more memories; and
one or more processors, communicatively coupled to the one or more memories, configured to:
receive, from user devices, activity data identifying activities of a process performed by users interacting with one or more user interfaces via the user devices,
wherein the activities include one or more of clicks, taps, scrolls, voice commands, or visual commands based on the users interacting with the one or more user interfaces;

preprocess the activity data to determine a context associated with the activities of the process performed by the users,
    wherein the one or more processors, to preprocess the activity data, are configure to;
        determine, based on information that is presented to the users via one or more hardware components of the user devices, one or more images, sounds, or vibrations that are presented to the users, and
        process the one or more images, sounds, or vibrations to determine one or more words or other information presented to the users;
receive baseline data identifying baselines associated with the process and first similarity labels associated with the baselines;
receive variant data identifying variants from the baselines and second similarity labels associated with the variants;
apply a sequence alignment model, to the activity data and the baseline data, to determine first similar sequences associated with the activities and the baselines;
apply the sequence alignment model, to the activity data and the variant data, to determine second similar sequences associated with the activities and the variants;
determine, based on the first similarity labels in the baseline data, and based on the first similar sequences, first label data identifying first labels for the activities;
determine, based on the second similarity labels in the variant data, and based on the second similar sequences, second label data identifying second labels for the activities;
identify, based on the first label data and the second label data, missing label data in the activity data;
receive third label data identifying third labels for the activities,
    wherein the third label data corresponds to the missing label data;
generate a process diagram based on the activity data, the first label data, the second label data, and the third label data; and
perform one or more actions based on the process diagram,
    wherein the one or more processors, to perform the one or more actions, are configured to:
        generate an electronic document specifying the process, based on the process diagram, and
        automatically create and send an electronic calendar invitation that includes the electronic document, including the process diagram, to a user device associated with a trainer or trainee.

8. The device of claim 7, wherein the one or more processors, when applying the sequence alignment model, to the activity data and the variant data, to determine the second similar sequences associated with the activities and the variants, are configured to:
    initialize a scoring matrix to zero to generate an initialized scoring matrix;
    populate the initialized scoring matrix with the activity data and the variant data, to generate a populated scoring matrix; and
    perform a traceback of the populated scoring matrix to determine the second similar sequences associated with the activities and the variants.

9. The device of claim 7, wherein the sequence alignment model is modified to utilize more than two types of combinations as a match and to utilize a bonus rewards scheme for determining match scores.

10. The device of claim 7, wherein the sequence alignment model is modified to utilize a repeated search for alignments and to utilize a non-binary match or mismatch scheme.

11. The device of claim 7, wherein the variant data includes historical data identifying historical variants from historical activities of the process.

12. The device of claim 7, wherein the one or more processors, to preprocess the activity data, are configured to:
    preprocess the activity data using an optical character recognition technique, a natural language processing technique, and a vibration analysis technique to determine the context associated with the activities of the process performed by the users via the user devices.

13. The device of claim 7, wherein the baseline data includes historical data identifying historical activities of the process.

14. A non-transitory computer-readable medium storing a set of instructions, the set of instructions comprising:
    one or more instructions that, when executed by one or more processors of a device, cause the device to:
        receive, from user devices, activity data identifying activities of a process performed by users interacting with one or more user interfaces via the user devices,
            wherein the activities include one or more of clicks, taps, scrolls, voice commands, or visual commands based on the users interacting with the one or more user interfaces;
        preprocess the activity data to determine a context associated with the activities of the process performed by the users,
            wherein the one or more instructions, that cause the device to preprocess the activity data, cause the device to:
                determine, based on information that is presented to the users via one or more hardware components of the user devices, one or more images, sounds, or vibrations that are presented to the users, and
                process the one or more images, sounds, or vibrations to determine one or more words or other information presented to the users;
        receive baseline data identifying baselines associated with the process and first similarity labels associated with the baselines;
        receive variant data identifying variants from the baselines and second similarity labels associated with the variants;
        apply a sequence alignment model, to the activity data and the baseline data, to determine first similar sequences associated with the activities and the baselines;
        apply the sequence alignment model, to the activity data and the variant data, to determine second similar sequences associated with the activities and the variants;
        determine, based on the first similarity labels in the baseline data, and based on the first similar sequences, first label data identifying first labels for the activities;
        determine, based on the second similarity labels in the variant data, and based on the second similar sequences, second label data identifying second labels for the activities;

generate a process diagram based on the activity data, the first label data, and the second label data;

generate an electronic document specifying the process, based on the process diagram; and automatically create and send an electronic calendar invitation that includes the electronic document, including the process diagram, to a user device associated with a trainer or trainee.

15. The non-transitory computer-readable medium of claim 14, wherein the one or more instructions further cause the device to:

identify, based on the first label data and the second label data, missing label data in the activity data;

receive third label data identifying third labels for the activities,
  wherein the third label data corresponds to the missing label data; and generate the process diagram based on the activity data, the first label data, the second label data, and the third label data.

16. The non-transitory computer-readable medium of claim 14, wherein the one or more instructions further cause the device to:

automatically schedule training for the users about the process.

17. The non-transitory computer-readable medium of claim 14, wherein the one or more instructions, that cause the device to apply the sequence alignment model, to the activity data and the baseline data, to determine the first similar sequences associated with the activities and the baselines, cause the device to:

initialize a scoring matrix to zero to generate an initialized scoring matrix;

populate the initialized scoring matrix with the activity data and the baseline data, to generate a populated scoring matrix; and perform a traceback of the populated scoring matrix to determine the first similar sequences associated with the activities and the baselines.

18. The non-transitory computer-readable medium of claim 14, wherein the one or more instructions, that cause the device to apply the sequence alignment model, to the activity data and the variant data, to determine the second similar sequences associated with the activities and the variants, cause the device to:

initialize a scoring matrix to zero to generate an initialized scoring matrix;

populate the initialized scoring matrix with the activity data and the variant data, to generate a populated scoring matrix; and perform a traceback of the populated scoring matrix to determine the second similar sequences associated with the activities and the variants.

19. The non-transitory computer-readable medium of claim 14, wherein the one or more instructions, that cause the device to preprocess the activity data, cause the device to:

preprocess the activity data using an optical recognition technique, a natural language processing technique, and a vibration analysis technique to determine the context associated with the activities of the process performed by the users via the user devices.

20. The method of claim 1, wherein performing the one or more actions comprises:

automatically scheduling training for the users about the process.

* * * * *